Feb. 23, 1965     D. E. PRITCHARD     3,170,980
OPTICAL TUNNEL SYSTEM
Filed May 9, 1962
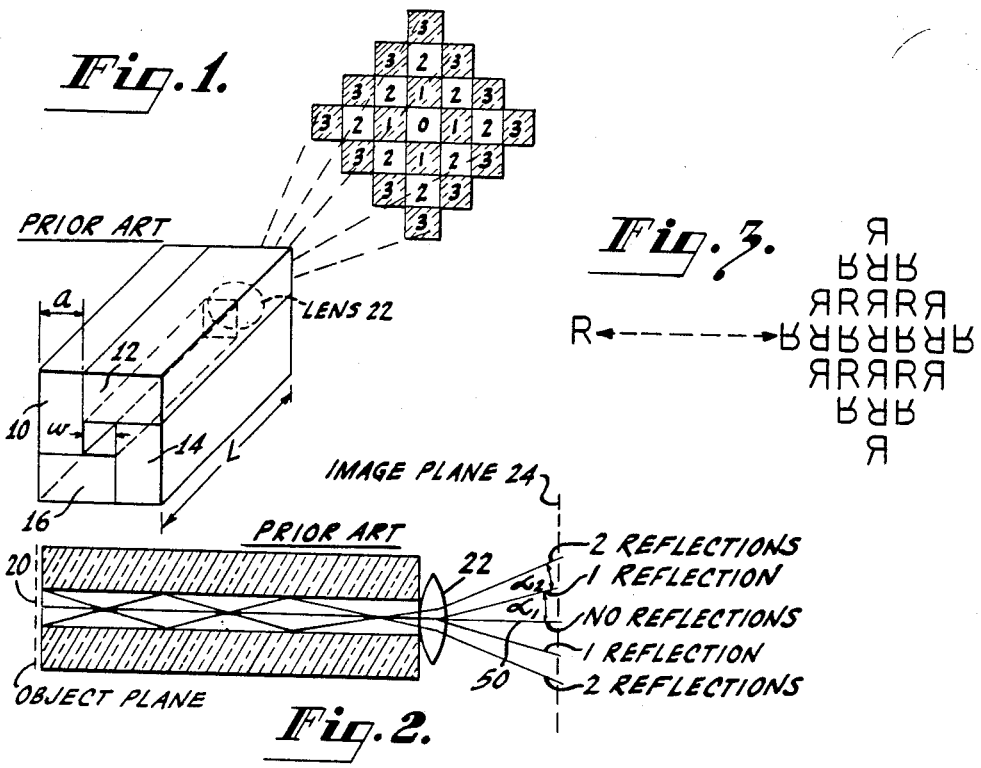
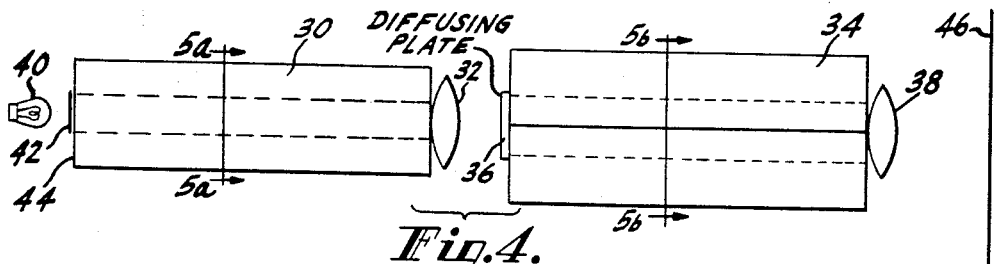
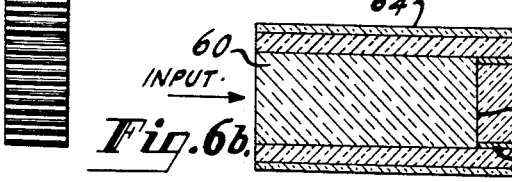
INVENTOR.
DAVID E. PRITCHARD
BY    *Samuel Cohen*
ATTORNEY

3,170,980
OPTICAL TUNNEL SYSTEM
David E. Pritchard, Pasadena, Calif., assignor to Radio Corporation of America, a corporation of Delaware
Filed May 9, 1962, Ser. No. 193,490
4 Claims. (Cl. 88—1)

The present invention relates to optics and, more particularly, to optical tunnel systems.

An object of the invention is to provide an optical tunnel system of improved information handling capacity.

Another object of the invention is to provide an optical tunnel system which has less critical tolerance requirements than prior optical systems.

The optical tunnel system of the invention includes a plurality of optical tunnels arranged in cascade. Put another way, the output of each optical tunnel serves as an input to the following optical tunnel.

The invention is described in greater detail below and is illustrated in the following drawing of which:

FIGS. 1 and 2 are perspective and cross-sectional views respectively of a prior art optical tunnel;

FIG. 3 illustrates the performance of the system of FIGS. 1 and 2;

FIG. 4 is a plan view of an optical tunnel system according to the present invention;

FIGS. 5a and 5b are cross-sections along lines 5a—5a and 5b—5b of FIG. 4;

FIG. 6a is a view of a fiber optics diffusing plate; and

FIG. 6b is an enlarged cross-sectional view of the glass fibers in the plate of FIG. 6a.

The optical tunnel shown in FIGS. 1 and 2 consists of four blocks of optical glass 10, 12, 14, 16 placed together so as to form a central opening or "tunnel" 18 of square cross-section. The inner surfaces of the tunnel are reflecting mirror surfaces and may be made by vacuum depositing aluminum or other reflecting metal on previously polished, flat surfaces.

If an illuminated object is placed at end 20 (FIG. 2) of the tunnel, its image is projected through the tunnel and the lens 22 onto an image plane 24. If the object is the character R, such as shown in FIG. 3, a matrix of R's, some upright, some inverted, some mirror images, and some inverted mirror images will appear at the image plane. One such matrix is shown in FIG. 3. The center image is not reflected from any of the mirror surfaces of the tunnel. The images immediately above, below, and to the right and left of the center image result from one reflection. These are indicated in FIG. 1 by the cross-hatched areas marked "1." The images which result from two reflections in the tunnel are clear in FIG. 1 and are legended "2." The images resulting from three reflections are cross-hatched in FIG. 1 and legended "3."

While only three reflections are shown in FIGS. 1–3, it should be appreciated that, in practice, it is possible to obtain many more reflections than this. This is discussed in more detail later.

Optical tunnels have many uses as, for example, in character reading machines, optical memories, analog-to-digital converters, comparators and so on. Some systems employing such tunnels are discussed, for example, in L. B. Scott, Patent No. 2,887,935, and in an article by S. Klein, "All Electronic Reading Machine," RCA Engineer, August-September 1961, page 36. The optical tunnels are useful not only to produce a large number of images from a single image but also in the reverse direction, that is, to produce from a large number of images a single image. When used in this way, a plurality of light sources are located behind the image plane 24 as shown, for example, in the Scott patent above.

Two important parameters in the design of optical tunnels are its length L and internal cross section $w^2$. There is a practical limit on each. The length is limited for optical and other reasons. The mirror surfaces of the optical tunnel must be very flat to prevent the mirror from becoming a cylindrical surface and introducing astigmatism into the image. This astigmatism would be different for the different light beams and would be essentially impossible to correct. As the optical tunnel is made longer, the problem of maintaining the mirror surface flat to the desired precision becomes more severe.

Another optical consideration limiting the optical tunnel length is the angle made between the adjacent mirrors. This angle must be 90° (typically plus or minus two seconds). This is to insure that the multiple output images appear the proper distance apart. As the tunnel is made longer, the problem of maintaining the angles between surfaces perpendicular also becomes more severe.

As a rule of thumb, manufacturers of high precision optical equipment state that the glass used in making the optical tunnel should have no dimension ratios greater than roughly 5:1. The reasons have to do with dimensional stability, resistance to bending and twisting, and so on. In other words, the length L should not be greater than five times the narrowest dimension (the thickness $a$) of each block of glass. This limitation means that the weight of the optical tunnel increases enormously as its length increases. For example, one practical 10" long optical tunnel weighs about 19 pounds. A 14" long optical tunnel of similar type weighs about 50 pounds. Further increase in the optical tunnel length introduces difficult tolerance problems having to do with surface curvature due to sagging or bulging of the glass.

In summary, there is a practical limit to the length L of an optical tunnel. In some of the discussion which follows, a length of 12½" is assumed. It can also be shown that many distortions introduced by the optical tunnel due to departures from the high precision requirements discussed above are more severe for the images undergoing greater numbers of reflections. Therefore, it would be advantageous to be able to reduce the number of reflections required to produce a given number of output images.

The number of reflections that can be obtained from an optical tunnel of given length and internal cross-section depends upon the maximum angle α permitted between a light beam leaving the lens and the lens axis. As can be seen in FIG. 2, the center of the beam corresponding to no reflections, passes through the center of the lens. The angle with the lens axis 50 is 0°. The center of the beam for one reflection is at an angle $\alpha_1$ to the lens axis. The center of the beam for two reflections is at an angle $\alpha_1+\alpha_2$ to the lens axis. The angle for three reflections is even greater and so on. It can be shown that even a perfect (a "diffraction limited") lens loses image quality with increasing off-axis angle α. (Even a perfect lens of finite size provides a spread-out image of a point source due to diffraction—the uncertainty in a light ray's direction after requiring it to pass through a finite size hole (a lens, for example.) It is smaller for shorter wavelength (bluer) light. ("Diffraction limited" means not limited by aberrations of one sort or another, but limited by this ultimate theoretical limit.) In the discussion which follows, the maximum angle α permitted is assumed to be 22° (corresponding to a solid cone of 44°). This corresponds to a very high quality lens, however, the discussion would be equally valid with a maximum angle α less than 22°.

If the length of the optical tunnel is fixed and the maximum lens angle α is also fixed, then the only optical tunnel parameter which can be varied to increase the number of images the system can handle is the tunnel cross-sectional area, $w^2$. As this parameter is decreased, the angle made by each reflected beam also decreases. For example, if the cross-section of the tunnel of FIG. 2 is decreased, the angle $\alpha_1+\alpha_2$ also decreases. Therefore, if the tunnel length is fixed, the number of reflections falling within the solid angle of 44° ($\alpha=22°$) increases only if the tunnel cross-section is decreased.

Unfortunately, reducing the cross-section $w^2$ of the tunnel in order to increase the number of images which can be produced by the tunnel introduces other problems. An important parameter in the optical tunnel performance is its "information capacity per frame." This may be thought of as a measure of the amount of information in the output image of the tunnel-lens system. One measurement of the information capacity (per frame) is "bit capacity" (per frame).

It can be shown that for perfect lenses, the bit capacity varies as the lens diameter squared ($d^2$). (This result is roughly correct for the best quality lenses now available in sizes smaller than 2 inches). Since the effective size of the lens is limited by the cross-section $w^2$ of the tunnel, decreasing the cross-section of the optical tunnel adversely affects the information handling capacity of the tunnel. Decreasing the cross-section also decreases the amount of light which can be applied to the tunnel and this, in turn, decreases the intensity of the images the tunnel can provide. In short, in a tunnel of fixed length, decreasing the tunnel cross-section to fit more output images into the image cone (the maximum solid angle $2\alpha$ assumed) may seriously adversely affect the image intensity and image quality, and therefore the system character handling capacity.

The chart below is a table giving certain calculated parameters for a single optical tunnel 12½" long. The mirror surfaces are coated with aluminum. The lens is assumed to be "diffraction limited" up to 22° off the lens axis.

The first entry in the table is $b$, the maximum number of reflections employed. The image pattern is the one shown in FIG. 1 (which is bounded by images formed with equal numbers of reflections). N, the total number of images formed, is equal to $2b^2+2b+1$.

The central image transmittance, $e$, is defined as the ratio of the light incident on the center image of the output pattern to the light emitted by the object at the input end of the tunnel.

$w$ is the tunnel width. It must decrease to increase the number of reflections which fall within the 22° angle $\alpha$, if the tunnel length remains fixed.

$i_{min}$ is the intensity of the dimmest image, that is, one of the images undergoing the maximum number of reflections, and $i_{max}$ is the intensity of the brightest image, that is, the center image. Their ratio, $r$, is tabulated.

The term $t$ refers to the transmittance of the least intense image; it is the product of $e$ and $r$ ($t=er$). The bit capacity per image is also tabulated. The table gives the values for only certain numbers of reflections.

| b | N | w | e | $r=\dfrac{i_{max}}{i_{min}}$ | t=er | Bit Capacity |
|---|---|---|---|---|---|---|
| 1 | 5 | 3.3" | .071 | .67 | $4.7\times10^{-2}$ | $2.6\times10^9$ |
| 2 | 13 | 2" | .026 | .55 | $1.4\times10^{-2}$ | $1.0\times10^9$ |
| 4 | 41 | 1.1" | .0078 | .40 | $3.1\times10^{-3}$ | $3.0\times10^9$ |
| 7 | 113 | .67" | .0029 | .27 | $7.4\times10^{-4}$ | $1.1\times10^8$ |
| 10 | 221 | .48" | .0015 | .16 | $2.4\times10^{-4}$ | $5.6\times10^7$ |
| 14 | 421 | .35" | .00078 | .089 | $7.0\times10^{-5}$ | $3.0\times10^7$ |
| 18 | 681 | .27" | .00047 | .049 | $2.3\times10^{-5}$ | $1.8\times10^7$ |
| 22 | 1,013 | .22" | .00031 | .027 | $8.1\times10^{-6}$ | $1.2\times10^7$ |
| 26 | 1,405 | .19" | .00023 | .015 | $3.5\times10^{-6}$ | $8.6\times10^6$ |

An embodiment of the present invention is shown in FIG. 4. It includes a first optical tunnel 30 having a lens 32 at one end. This tunnel is followed by a second optical tunnel 34 having a diffusing plate 36 at one end and a lens 38 at the opposite end. The diffusing plate should be of fine grain and may be a fiber optics diffuser, as discussed later, a photographic emulsion on a film, or other suitable very fine grain structure.

The system can operate from left to right or from right to left. In the first mode of operation, a light source shown at 40 illuminates an object 42 in the object plane. This object may be a character which, for example, appears on a moving film. Alternatively, the source 40 and object 42 together may consist of a cathode ray tube which traces a character on the screen of the tube. Many other types of inputs are possible. The matrix of objects which appears to exist at the end 44 of the optical tunnel is projected through lens 32 onto the diffuser plate 36. The image on the diffuser plate, which consists of a matrix, that is, a plurality of images of the original object, now passes through the second optical tunnel 34 and the lens 38, and is projected in the image plane 46. It should be appreciated that the system can operate in the opposite direction. In this case, there are light sources behind plane 46 and characters or the like at plane 46. The image, in this case, is received at 42. A printer for ideographic characters might use this arrangement.

The number $N_t$ of images produced at the image plane 46 is $N_t=N_1\times N_2$, where $N_1$ is the number of images produced by the first optical tunnel and $N_2$ is the number of images produced by the second optical tunnel.

The overall light transmittance of a two tunnel system is computed by multiplying the transmittances of the two tunnels. (An additional factor of .3 is also added to allow for light reflected or dissipated by the diffuser.)

The optical tunnel performs a multiplying operation with respect to input information. For this reason, it is necessary for the first tunnel 30 to have a bit capacity somewhat larger than the bit capacity of the second tunnel 34 divided by the number of images produced by the second tunnel. (This is a way of guaranteeing that the image produced by the first tunnel on the diffuser plate at the end of the second tunnel will be sharper than is necessary for best performance of the second tunnel.) In practice, this condition is easy to satisfy. The result is that the quality of the first lens and tunnel (32, 30) assembly need not be as good as that of the second assembly.

The performance of this system compared to that of a single tunnel can be demonstrated by specific example. As is shown in the table above, a single tunnel which utilizes 26 reflections produces 1405 images. The tunnel width is 0.19" for a tunnel 12½" long in which all images are within the solid angle of 44° ($\alpha=22°$). The transmittance $t$ for the least intense beam is $3.5\times10^{-6}$ and the theoretical bit capacity can be shown to be $8.6\times10^6$. A two tunnel system in which there are seven reflections in the first optical tunnel 30 (FIG. 4) and two reflections in the second tunnel 34 (FIG. 4) produces $13\times113=1469$ images. The transmittance $t_s$ of the system is $t_1\times t_2\times t_d$, where $t_1$ and $t_2$ are the transmittances of the first and second optical tunnels, respectively, and $t_d$ is the transmittance of the diffuser 36. Substituting numbers gives $t_s=.3\times1.4\times7.4\times10^{-2}\times10^{-4}=3.1\times10^{-6}$ compared to $3.5\times10^{-6}$ for the single tunnel system. The widths $w$ of the two tunnels are 0.67" and 2", respectively. The theoretical bit capacity of the two tunnel system is roughly $7\times10^8$—as compared with $8.6\times10^6$ for the single tunnel system. In this example, both optical tunnel and lens assemblies should be of about equal quality.

An even simpler two tunnel system employs two four-reflection tunnels. This gives 1681 images. Each tunnel is 1.1" in width $w$. The overall transmittance is $3\times10^{-6}$ and the theoretical bit capacity is $3\times10^8$. Here, the first optical tunnel may be of substantially lower quality than the second one.

It was stated previously that the diffusing plate 36 should be a fine grain diffusing plate. A preferred form of such a diffusing plate is shown in FIGS. 6a and 6b.

The plate consists of a plurality of optical fibers arranged side-by-side with the opposite ends of the fibers arranged in parallel planes as shown in FIG. 6a.

One of the fibers is shown in more detail in FIG. 6b. It includes a core 60 of high index of refraction glass surrounded by a coating 62 of somewhat lower index of refraction glass. The final or outer coating 64 is a glass having a high absorption factor. This much of the fiber optics element is known.

The core material 60 at the output end of each fiber is removed by differentially etching it away. This is easily done by making the core of a glass which is more soluble in the etchant (such as a suitable acid) than the coatings. A similar technique which is employed to etch away a coating rather than a core is described in Hicks et al. Patent No. 2,992,587. Thereafter, the inner surface 66 of the cylinder which remains is coated with a reflective material such as aluminum. The latter may be vacuum deposited onto the inner walls by directing the aluminum into the cylinder at an acute angle to the core axis. This substantially prevents the aluminum from depositing at the bottom of the cylinder 68. During the evaporation, the bundle of fibers is rotated about the center axis to the bundle to obtain a uniform coating.

After the cylinder wall is coated with aluminum, the end of the cylinder is filled with a translucent material 70. A particularly suitable translucent material is a P–11 phosphor such as used in making kinescopes, however, other translucent materials are also suitable.

It may be observed in FIGS. 1 and 3 that the matrix of characters projected by the lens 32 are arranged in a square pattern one side of which is rotated 45° with respect to the width dimension of the optical tunnel. While not essential, it is preferred that the second optical tunnel 34 be rotated about its axis through an angle of 45° with respect to the first optical tunnel 30. This is to permit optimum utilization of the optical tunnel cross-section.

In the embodiment of the invention shown in FIG. 4, the two optical tunnels 30 and 34 are arranged on a common axis. This is not essential to the operation. Instead, the two optical tunnels may be at an angle to one another and a system of lenses and mirrors or a bundle of fiber optics employed to transmit the image at the output of one tunnel to the input to the second tunnel.

Also, the diffuser can be replaced by an image intensifier tube, that is, a tube having a photoemissive cathode, an electron lens, and a phosphor output surface. This tube has the required diffusing properties and, in addition, provides a substantial gain in brightness. It also permits electronic image translation and change in size of the image applied to the second optical tunnel, as desired.

The optical tunnel system described is of square cross-section. However, optical tunnels are known with other cross-sections. For example, optical tunnels of triangular or rectangular cross-section are known. The present invention is suitable for use with optical tunnels of cross-section other than square cross-section. Again, as an example, the system operates also with two or more optical tunnels of triangular cross-section.

One final point might be mentioned. In the example of the invention illustrated, two optical tunnel systems are employed. It is also possible to use more than two tunnels and thereby decrease the number of reflections correspondingly.

What is claimed is:
1. In combination,
   first and second optical tunnels arranged on a common optical axis, each said tunnel comprising a hollow structure of regular cross-section and having internal mirror surfaces;
   a pair of lenses, each located at the output end of a different one of the tunnels;
   diffusing means positioned between the two tunnels at the input end of the second optical tunnel;
   a light source located at the input end of the first optical tunnel;
   an object to be projected located between the light source and the input end of the first optical tunnel, whereby multiple images of said object are projected onto the diffusing means when the object is illuminated by said light source; and
   means located at the output end of the second tunnel beyond the lens for receiving multiple images of the multiple images appearing on the diffusing means.
2. In combination,
   first and second optical tunnels arranged on a common optical axis, each said tunnel comprising a hollow structure of regular cross-section and having internal mirror surfaces;
   a pair of lenses, each located at the output end of a different one of the tunnels;
   a fiber optics diffusing plate positioned between the two tunnels at the input end of the second optical tunnel;
   a light source located at the input end of the first optical tunnel;
   an object to be projected located between the light source and the input end of the first optical tunnel, whereby multiple images of said object are projected onto the diffusing plate when the object is illuminated by said light source; and
   means located at the output end of the second tunnel beyond the lens for receiving multiple images of the multiple images appearing on the diffusing plate.
3. In combination,
   first and second optical tunnels arranged on a common optical axis, each said tunnel comprising a hollow structure of regular cross-section and each having internal mirror surfaces;
   a pair of lenses, each located at the input end of a different tunnel;
   diffusing means positioned between the two tunnels at the output end of the first optical tunnel;
   an object to be projected located off said optical axis and beyond the lens at the input end of the first optical tunnel, whereby, when illuminated, an image of said object appears on the diffusing means, but not necessarily on the optical axis; and
   means at the output end of the second optical tunnel and on said optical axis for receiving an image of the image appearing on the diffusing means.
4. Two optical tunnel systems arranged on a common axis, each said system including a hollow structure of square internal cross-section formed with internal mirror surfaces, and each system including also a lens at one end of the tunnel, diffusing plate between the lens for one tunnel and the adjacent end of the other tunnel, and one of said optical tunnels being rotated through an angle of 45° about the optical axis with respect to the other optical tunnel.

References Cited by the Examiner
UNITED STATES PATENTS

| 1,577,388 | 3/26 | Twyman | 88—15 X |
| 1,944,111 | 1/34 | Schieren. | |
| 2,985,784 | 5/61 | MacNeillie. | |

JEWELL H. PEDERSEN, *Primary Examiner.*